(12) United States Patent
La Forest et al.

(10) Patent No.: US 9,193,113 B2
(45) Date of Patent: Nov. 24, 2015

(54) APPARATUS FOR CARBON FIBER PROCESSING AND PITCH DENSIFICATION

(71) Applicant: Honeywell International Inc., Morristown, NJ (US)

(72) Inventors: Mark L. La Forest, Granger, IN (US); Mark C. James, Plymouth, MN (US); Roger L. Klinedinst, North Liberty, IN (US); Neil Murdie, Granger, IN (US); David M. Wright, Springfield, MA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/337,019

(22) Filed: Jul. 21, 2014

(65) Prior Publication Data
US 2014/0327169 A1 Nov. 6, 2014

Related U.S. Application Data

(62) Division of application No. 12/971,325, filed on Dec. 17, 2010.

(51) Int. Cl.
 B29C 70/48 (2006.01)
 C04B 35/83 (2006.01)
 (Continued)

(52) U.S. Cl.
 CPC .............. *B29C 70/48* (2013.01); *C04B 35/83* (2013.01); *F16D 69/023* (2013.01); *B29K 2105/06* (2013.01); *B29K 2307/04* (2013.01);
 (Continued)

(58) Field of Classification Search
 USPC ........................................................ 264/257
 See application file for complete search history.

(56) References Cited

U.S. PATENT DOCUMENTS 3,028,284 A * 4/1962 Reeves .......................... 264/257
3,596,314 A   8/1971 Krugler
(Continued)

FOREIGN PATENT DOCUMENTS

| CN | 1473103 A | 2/2004 |
| CN | 1744974 A | 3/2006 |

(Continued)

OTHER PUBLICATIONS

First Office Action and Search Report, and translation thereof, from counterpart Chinese Patent Application No. 201110463143.2, dated Feb. 27, 2015, 23 pp.

*Primary Examiner* — Joseph S Del Sole
*Assistant Examiner* — John Robitaille
(74) *Attorney, Agent, or Firm* — Shumaker & Sieffert, P.A.

(57) ABSTRACT

A pitch densification apparatus may be used to form a carbon-carbon composite material. The apparatus may be used to compress a carbon fiber material, and, thereafter, pitch densify the carbon fiber material. The compression and pitch densification of the carbon fiber material may be carried out within the same mold cavity of the pitch densification apparatus. In one example, an apparatus may comprise a mold defining a mold cavity that is configured to receive a material to be densified. The mold cavity is configured to be adjusted from a first volume to a second volume less than the first volume to compress the material in the mold cavity. The example apparatus may further comprise a gas source configured to apply a gas pressure in the mold cavity to force pitch into the material in the mold cavity to densify the material, and a vacuum source configured to create a vacuum pressure in the mold cavity at least prior to the application of the gas pressure.

15 Claims, 8 Drawing Sheets

(51) Int. Cl.
*F16D 69/02* (2006.01)
*B29K 105/06* (2006.01)
*B29L 31/16* (2006.01)
*B29L 31/00* (2006.01)
*B29K 307/04* (2006.01)

(52) U.S. Cl.
CPC ...... *B29L2031/16* (2013.01); *B29L 2031/7482* (2013.01); *C04B 2235/608* (2013.01); *C04B 2235/77* (2013.01)

(56) References Cited

U.S. PATENT DOCUMENTS

| | | | |
|---|---|---|---|
| 3,703,255 A | 11/1972 | Wade | |
| 3,975,128 A | 8/1976 | Schluter | |
| 3,982,877 A | 9/1976 | Wyeth et al. | |
| 4,264,556 A | 4/1981 | Kumar et al. | |
| 4,428,906 A | 1/1984 | Rozmus | |
| 4,681,718 A | 7/1987 | Oldham | |
| 4,756,680 A | 7/1988 | Ishii | |
| 4,957,585 A | 9/1990 | Semff | |
| 5,137,663 A | 8/1992 | Conaway | |
| 5,137,755 A | 8/1992 | Fujikawa et al. | |
| 5,147,588 A | 9/1992 | Okura et al. | |
| 5,187,001 A | 2/1993 | Brew | |
| 5,248,467 A | 9/1993 | Cushman | |
| 5,306,448 A | 4/1994 | Kromrey | |
| 5,382,392 A | 1/1995 | Prevorsek et al. | |
| 5,516,271 A | 5/1996 | Swenor et al. | |
| 5,518,385 A | 5/1996 | Graff | |
| 6,054,082 A | 4/2000 | Heide et al. | |
| 6,183,583 B1 * | 2/2001 | Duval et al. ............ | 156/148 |
| 6,261,486 B1 | 7/2001 | Sulzbach et al. | |
| 6,267,920 B1 | 7/2001 | Arakawa et al. | |
| 6,305,925 B1 | 10/2001 | Cassani | |
| 6,325,608 B1 | 12/2001 | Shivakumar et al. | |
| 6,372,166 B1 | 4/2002 | Cassani | |
| 6,508,970 B2 | 1/2003 | Chandra | |
| 6,521,152 B1 | 2/2003 | Wood et al. | |
| 6,537,470 B1 | 3/2003 | Wood et al. | |
| 6,939,490 B2 | 9/2005 | La Forest et al. | |
| 7,025,913 B2 | 4/2006 | La Forest et al. | |
| 7,063,870 B2 | 6/2006 | La Forest et al. | |
| 7,172,408 B2 | 2/2007 | Wood et al. | |
| 7,198,739 B2 | 4/2007 | La Forest et al. | |
| 7,252,499 B2 | 8/2007 | La Forest et al. | |
| 7,300,894 B2 | 11/2007 | Goodell et al. | |
| 7,318,717 B2 | 1/2008 | Wood et al. | |
| 7,332,112 B1 | 2/2008 | Shivakumar et al. | |
| 7,393,370 B2 | 7/2008 | Peterman, Jr. et al. | |
| 7,442,024 B2 | 10/2008 | La Forest et al. | |
| 7,632,435 B2 | 12/2009 | Simpson et al. | |
| 7,698,817 B2 | 4/2010 | Khambete et al. | |
| 7,700,014 B2 | 4/2010 | Simpson et al. | |
| 7,727,448 B2 | 6/2010 | Boutefeu et al. | |
| 7,867,566 B2 | 1/2011 | Blanton et al. | |
| 7,972,129 B2 | 7/2011 | O'Donoghue | |
| 2003/0030188 A1 | 2/2003 | Spengler | |
| 2003/0111752 A1 | 6/2003 | Wood et al. | |
| 2004/0113302 A1 | 6/2004 | La Forest et al. | |
| 2004/0168612 A1 | 9/2004 | Saver | |
| 2006/0197244 A1 | 9/2006 | Simpson et al. | |
| 2006/0279012 A1 * | 12/2006 | Simpson et al. ............ | 264/29.5 |
| 2007/0063378 A1 | 3/2007 | O'Donoghue | |
| 2012/0104641 A1 | 5/2012 | La Forest et al. | |
| 2012/0104659 A1 | 5/2012 | La Forest et al. | |

FOREIGN PATENT DOCUMENTS

| | | |
|---|---|---|
| CN | 1744985 A | 3/2006 |
| CN | 1775514 A | 5/2006 |
| GB | 2389068 A | 12/2003 |
| WO | 9622871 A1 | 8/1996 |

* cited by examiner

APPARATUS FOR CARBON FIBER PROCESSING AND PITCH DENSIFICATION

This application is a divisional application of U.S. application Ser. No. 12/971,325, filed Dec. 17, 2010, the entire content of which is incorporated herein by reference.

TECHNICAL FIELD

This disclosure relates to pitch densification and, more particularly, to pitch densification for carbon-carbon composites.

BACKGROUND

Carbon fiber-reinforced carbon materials, also referred to as carbon-carbon (C—C) materials, are composite materials that generally include carbon fibers reinforced in a matrix of carbon material. The C—C composite materials are found in many rigorous, high temperature applications. For example, the aerospace industry is known to employ C—C composite materials for manufacturing different aircraft structural components. Example applications include rocket nozzles, nose cones, and friction materials for commercial and military aircraft such as, e.g., brake friction materials.

SUMMARY

In general, the disclosure relates to apparatuses and techniques for processing fiber materials and densifying the processed fiber materials with pitch. In some examples, a single apparatus may be configured to receive a carbon fiber material, compress the carbon fiber material, and densify the compressed carbon fiber material with pitch. The apparatus may perform the different processing steps without removing the material from the apparatus.

In one example according to the disclosure, an apparatus includes a mold defining a mold cavity configured to receive a material to be densified, where the mold cavity is configured to be adjusted from a first volume to a second volume less than the first volume to compress the material in the mold cavity. The apparatus also includes a gas source configured to apply a gas pressure in the mold cavity to force pitch into the material in the mold cavity to densify the material, and a vacuum source configured to create a vacuum pressure in the mold cavity at least prior to the application of the gas pressure.

In another example according to the disclosure, a method is disclosed that includes inserting a material to be densified into a mold cavity of an apparatus, wherein the apparatus is configured to densify the material within the mold cavity using a vacuum pressure infiltration cycle; compressing the material in the mold cavity by adjusting the mold cavity from a first volume to a second volume less than the first volume; and pitch densifying the compressed material in the mold cavity using the vacuum pressure infiltration cycle.

The details of one or more examples are set forth in the accompanying drawings and the description below. Other features, objects, and advantages will be apparent from the description and drawings, and from the claims.

DETAILED DESCRIPTION

Figure 1:
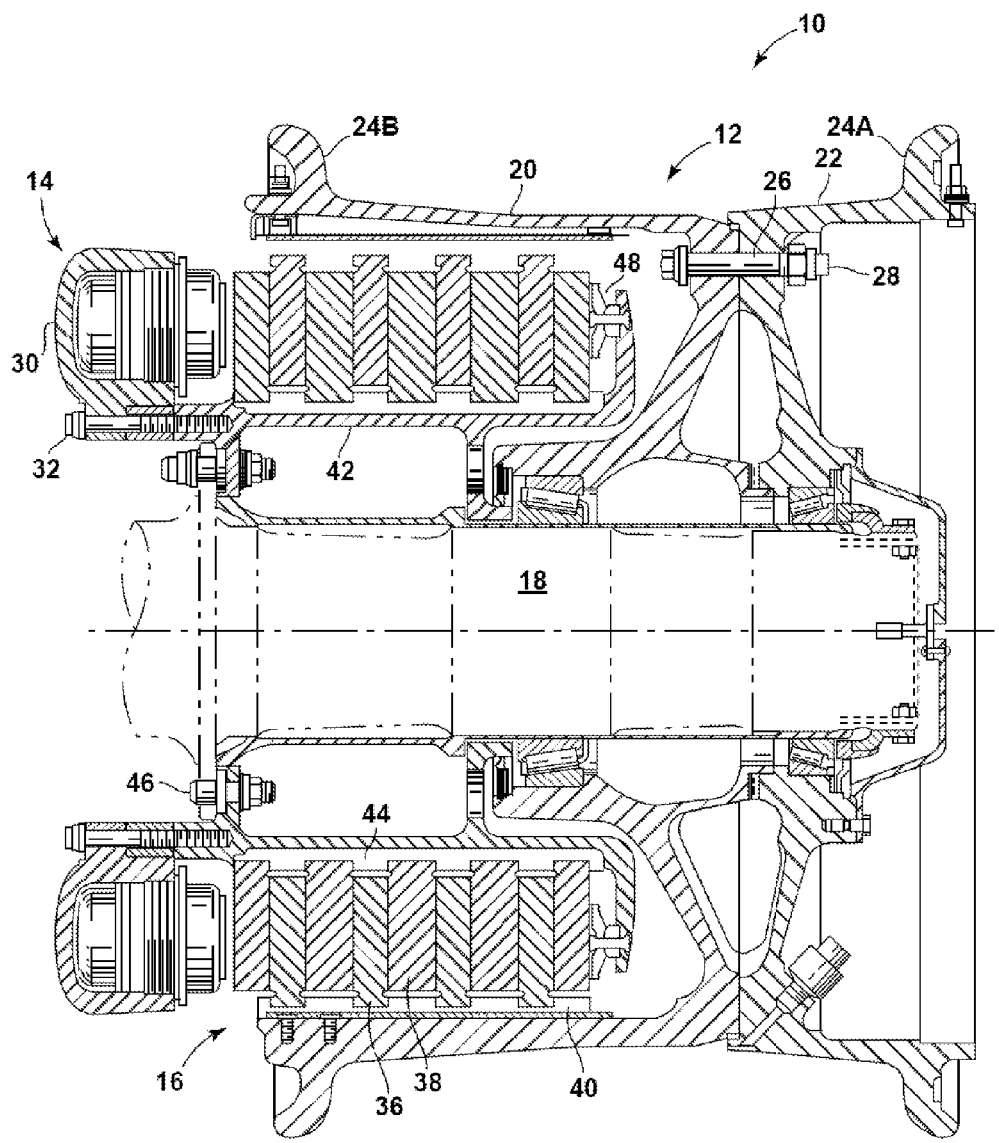
FIG. 1 is a schematic diagram illustrating of an example aircraft brake assembly.

In general, the disclosure relates to apparatuses and techniques for processing fibrous material and densifying the processed fibrous materials with pitch. In some examples, a single apparatus may be configured to receive a carbon-based fiber material (also referred to herein as a "carbon fiber material"), compress the carbon fiber material, and densify the compressed carbon fiber material with pitch. The apparatus may be configured such that the carbon fiber material may be compressed and densified with pitch within the same mold cavity of the apparatus.

To process a carbon fiber material using such an example apparatus, the material may be inserted within a mold cavity. The volume of the mold cavity may then be reduced to compress the carbon fiber material located within the mold cavity. The compression of the carbon material by reducing the mold cavity volume serves to increase the fiber volume of the carbon material in the mold cavity. Put another way, the fiber density within the mold cavity is increased since the overall volume of the mold cavity is reduced while the amount of fiber material in the mold cavity is substantially constant. In practice, the volume of the mold cavity may be reduced to provide for a desired fiber volume of the carbon fiber material in the mold.

Following the compression of the carbon fiber material, the apparatus may be configured to thereafter impregnate the carbon fiber material with pitch within the mold cavity of the apparatus using gas pressure, vacuum pressure, or a combination of gas pressure and vacuum pressure. For instance, after the material has been compressed in the mold cavity, the apparatus may be configured to impregnate the carbon fiber material in the mold cavity using a combination of gas pressure and vacuum pressure during one or more vacuum pressure infiltration (VPI) cycles. In some examples, depending on the particular material used, the carbon fiber material may optionally be needled within the mold cavity to entangle different carbon fibers of the carbon fiber material prior to being impregnated with pitch (e.g., prior to being compressed within the mold cavity).

For instances in which a carbon fiber material is compressed by reducing the volume of the mold cavity and then densified in the same mold cavity, the carbon fiber material does not need to be inserted into a preform fabrication apparatuses to be fabricated into a preform (which may include compression and/or carbonization of the carbon material), removed from the first preform apparatus, and then inserted and densified in a separate pitch densification apparatus.

Instead, compression and densification processes may be performed on a carbon fiber material within the same apparatus. Because such an example apparatus does not require a carbon fiber material that is first fabricated into a preform in a first apparatus to be removed and inserted into a second apparatus for densification, the apparatus may eliminate one or more processing steps during the fabrication of a C—C composite component.

In some examples, an apparatus in accordance with the disclosure may process carbon fiber materials that may not otherwise be readily fabricated into a preform. For example, an example apparatus in accordance with the disclosure may process carbonized fibers (carbon and/or carbonatious fibers that have been carbonized) or pitch fibers (fibers constructed of pitch material), which are generally too brittle to manufacture into a preform. In some instances, because an example apparatus may process carbonized fibers, pitch fibers, or the like, the need for a separate apparatus to perform processing steps such as preform fabrication or carbonization may be eliminated.

In some instances, to fabricate a C—C composite material component, a carbon-based fiber material may undergo multiple processing steps in different apparatuses to arrange, strengthen, and densify the carbon fiber material into a formed component. For example, a carbon fiber material may be processed into a carbon preform using one or more apparatuses. The preform processing steps may add mechanical strength to the carbon fiber material to prepare the carbon fiber material to receive pressurized pitch during pitch densification.

In different examples, a carbon fiber material may be processed into a preform by arranging the carbon fiber material into the shape of a finished component, adding a binder, e.g., a phenolic resin, to the material, needling the material, and/or carbonizing the material. Such processing steps may each be performed on separate respective apparatuses. For example, in cases in which oxidized PAN fiber is used, after being arranged into the shape of a finished component and needled on one or more apparatuses, the carbon material may be transferred to a separate carbonization apparatus. The carbonization apparatus may carbonize the polyacrylonitrile (PAN) fibers by heating the material in an inert atmosphere to remove non-carbon elements (e.g., H, N, O, S, or the like) and other impurities from the material. In this manner, the carbon fiber material may be fabricated into a preform.

After transforming the carbon fiber material into a preform, in some examples, the preform may be transferred to a separate apparatus for pitch densification. For example the preform may be transferred to an apparatus that is capable of impregnating the preform with pitch via resin transfer molding (RTM) or vacuum pressure infiltration (VPI). In this manner, the preform may be further processed into a C—C composite material. Overall, such processing requires multiple different apparatuses to fabricate a C—C composite material from In accordance with some examples described in this disclosure, an apparatus may be configured to both process a carbon fiber material to receive pitch and to impregnate the processed carbon fiber material with pitch. In some examples, the carbon fiber material may be inserted into a mold cavity of the apparatus and compressed within the mold cavity. In some examples, the carbon fiber material inserted and compressed within the mold cavity may include fiber material that has been carbonized prior to being inserted in the mold cavity. Examples of such material may include carbonized PAN fibers, carbonized pitch fibers, carbonized rayon fibers, and the like.

After compressing the carbon fiber material in the mold cavity, the apparatus may be configured to thereafter impregnate the carbon fiber material with pitch within the same mold cavity using gas pressure, vacuum pressure, or a combination of gas pressure and vacuum pressure. For instance, the apparatus may be configured to impregnate the carbon fiber material with a combination of gas pressure and vacuum pressure using one or more vacuum pressure infiltration (VPI) cycles. In this manner, the apparatus may process a carbon fiber material by compressing the carbon material and also impregnating the material with pitch within the same apparatus.

In some examples, an apparatus in accordance with the disclosure may be used to process and pitch densify a wide range of carbon fiber materials to fabricate a C—C composite component. For example, as noted above, an apparatus may be configured to process and pitch densify a pre-carbonized carbon fiber material. A pre-carbonized carbon fiber material may be a fiber material that has undergone carbonization to remove non-carbon elements prior to being inserted in an apparatus for compression and pitch densification. The use of a pre-carbonized carbon fiber material may eliminate carbonization processing such as, e.g., a carbonization step performed during fabrication of a preform, that may otherwise be performed during the fabrication of a C—C composite component.

In some instances, a carbon fiber material that is processed on an example apparatus in accordance with the disclosure does not require a separate binder material to hold the different fibers of the carbon fiber material together. Instead, such an example apparatus may add melted pitch a carbon fiber material the does not include a separate binder material. The pitch may both increase the density of the material (densify the material) and bind the different fibers of the material together. In this manner, the pitch material may serve to both densify and bind the compressed material together with in the mold cavity.

Example apparatus features and carbon fiber materials will be described in greater detail with reference to FIGS. 2-6. An associated example technique is described below with reference to FIG. 7. However, an example aircraft brake assembly that may include one or more C—C composite materials manufactured in accordance with examples of this disclosure will first be described with reference to FIG. 1.

FIG. 1 is a conceptual diagram illustrating an example assembly that may include one or more C—C composite material components formed in accordance with the techniques of this disclosure. In particular, FIG. 1 illustrates an aircraft brake assembly 10, which includes wheel 12, actuator assembly 14, brake stack 16, and axle 18. Wheel 12 includes wheel hub 20, wheel outrigger flange 22, bead seats 24A and 24B, lug bolt 26, and lug nut 28. Actuator assembly 14 includes actuator housing 30, actuator housing bolt 32, and ram (not labeled). Brake stack 16 includes alternating rotor discs 36 and stators 38, which move relative to each other. Rotor discs 36 are mounted to wheel 12, and in particular wheel hub 20, by beam keys 40. Stator discs are mounted to axle 18, and in particular torque tube 42, by splines 44. Wheel assembly 10 may support any variety of private, commercial, or military aircraft.

Wheel assembly 10 includes wheel 18, which in the example of FIG. 1 is defined by a wheel hub 20 and a wheel outrigger flange 22. Wheel outrigger flange 22 is mechanically affixed to wheel hub 20 by lug bolts 26 and lug nuts 28. Wheel 12 defines bead seals 24A and 24B. During assembly, an inflatable tire (not shown) may be placed over wheel hub 20 and secured on an opposite side by wheel outrigger flange 22. Thereafter, lug nuts 28 can be tightened on lug bolts 26, and the inflatable tire can be inflated with bead seals 24A and 24B providing a hermetic seal for the inflatable tire.

Wheel assembly 10 may be mounted to an aircraft via torque tube 42 and axle 18. In the example of FIG. 1, torque tube 42 is affixed to axle 18 by a plurality of bolts 46. Torque tube 42 supports actuator assembly 14 and stators 38. Axle 18 may be mounted on a strut of a landing gear (not shown) to connect wheel assembly 10 to an aircraft.

During operation of the aircraft, braking may be necessary from time to time, such as during landing and taxiing. Accordingly, wheel assembly 10 may support braking through actuator assembly 14 and brake stack 16. Actuator assembly 14 includes actuator housing 30 and ram 34. Actuator assembly 14 may include different types of actuators such as, e.g., an electrical-mechanical actuator, a hydraulic actuator, a pneumatic actuator, or the like. During operation, ram 34 may extend away from actuator housing 30 to axially compress brake stack 16 against compression point 48 for braking.

Brake stack 16 includes alternating rotor discs 36 and stator discs 38. Rotor discs 36 are mounted to wheel hub 20 for common rotation by beam keys 40. Stator discs 38 are mounted to torque tube 42 for common rotation by splines 44. In the example of FIG. 1, brake stack 16 includes four rotors and five stators. However, a different number of rotors and/or stators may be included in brake stack 16. Further, the relative positions of the rotors and stators may be reverse, e.g., such that rotor discs 36 are mounted to torque tube 42 and stator discs 38 are mounted to wheel hub 20.

Rotor discs 36 and stator discs 38 may provide opposing friction surfaces for braking an aircraft. As kinetic energy of a moving aircraft is transferred into thermal energy in brake stack 16, temperatures may rapidly increase in brake stack 16, e.g., beyond 200 degrees Celsius. With some aircraft, emergency braking may result in temperatures in excess of 500 degrees Celsius, and in some cases, even beyond 800 degrees Celsius. As such, rotor discs 36 and stator discs 38 that form brake stack 16 may include robust, thermally stable materials capable of operating at such temperatures. In one example, rotor discs 36 and stator discs 38 are formed of a metal alloy such as, e.g., a super alloy based on Ni, Co, Fe, or the like.

In another example, rotor discs 36 and/or stator discs 38 are formed of a C—C composite material fabricated according to one or more example techniques of this disclosure. In particular, at least one of rotor discs 36 and/or at least one of stator discs 38 may be formed from a carbon-based fiber material fabricated using a pitch densification apparatus, where the apparatus is configured to receive a carbon fiber material in a mold cavity, compress the carbon fiber material in the mold cavity, and impregnate the processed carbon fiber material with pitch to densify the material in the mold cavity. From this compressed and densified carbon fiber material, a C—C composite component may be formed that defines a general shape of a rotor disc or stator disc.

Independent of the specific material chosen, rotor discs 36 and stator discs 38 may be formed of the same materials or different materials. For example, wheel assembly 10 may includes metal rotor discs 36 and C—C composite stator discs 38, or vice versa. Further, each disc of the rotor discs 36 and/or each disc of the stator discs 38 may be formed of the same materials or at least one disc of rotor discs 36 and/or stator discs 38 may be formed of a different material than at least one other disc of the rotor discs 36 and/or stator discs 38.

As noted, rotor discs 36 and stator discs 38 may be mounted in wheel assembly 10 by beam keys 40 and splines 44, respectively. Beam keys 42 may be circumferentially spaced about an inner portion of wheel hub 20. Beam keys may be shaped with opposing ends (e.g., opposite sides of a rectangular) and may have one end mechanically affixed to an inner portion of wheel hub 20 and an opposite end mechanically affixed to an outer portion of wheel hub 20. Beam keys 42 may be integrally formed with wheel hub 20 or may be separate from and mechanically affixed to wheel hub 20, e.g., to provide a thermal barrier between rotor discs 36 and wheel hub 20. Toward that end, in different examples, wheel assembly 10 may include a heat shield (not shown) that extends out radially and outwardly surrounds brake stack 16, e.g., to limit thermal transfer between brake stack 16 and wheel 12.

Splines 44 may be circumferentially spaced about an outer portion of torque tube 42. Splines 44 may be integrally formed with torque tube 42 or may be separate from and mechanically affixed to torque tube 42. In some examples, splines 44 may define lateral grooves in torque tube 42. As such, stator discs 38 may include a plurality of radially inwardly disposed notches configured to be inserted into a spline.

Because beam keys 40 and splines 44 may be in thermal contact with rotor discs 36 and stator discs 38, respectively, beam keys 40 and/or splines 44 may be made of thermally stable materials including, e.g., those materials discussed above with respect to rotor discs 36 and stator discs 38. Accordingly, in some examples, example techniques of the disclosure may be used to form a beam key and/or spline for wheel assembly 10. For example, a pitch densification apparatus, such as, e.g., apparatus 50 (FIG. 2), that is configured receive a carbon fiber material, compress and/or needle the carbon fiber material, and impregnate the compressed and/or needled carbon fiber material with pitch all within the same mold cavity, may be used to form a C—C composite component having a general shape of beam key 40 and/or spline 44.

Figure 2:
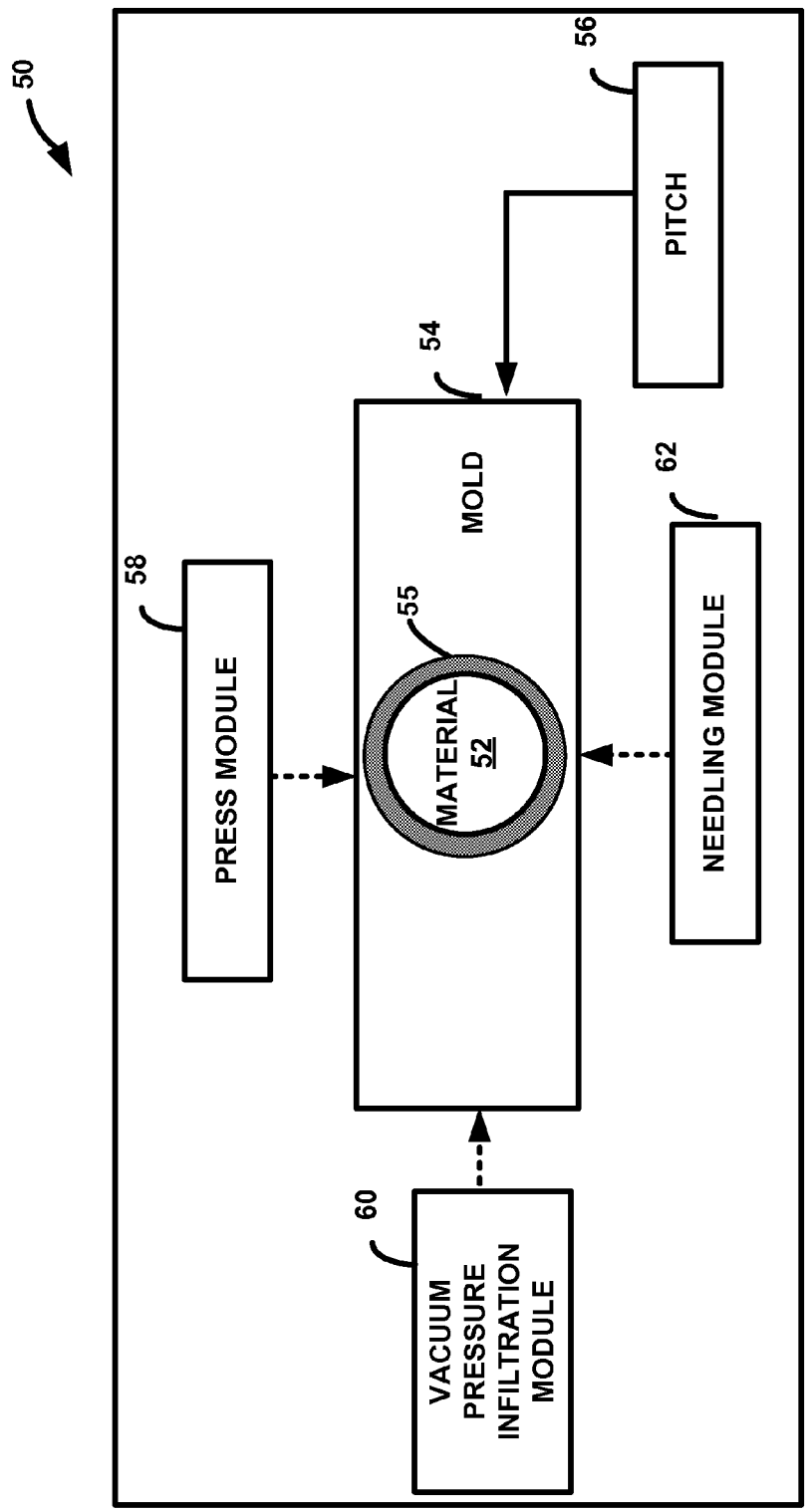
FIG. 2 is a conceptual block diagram illustrating an example apparatus configured to process and pitch densify a carbon fiber material.

FIG. 2 is a conceptual block diagram illustrating an example apparatus 50. Apparatus 50 is configured to process material 52 in mold cavity 55 of mold 54 and pitch densify the processed material without removing material 52 from mold cavity 55 of mold 54. In particular, apparatus 50 is configured to process material 52 by reducing the volume of mold cavity 55 (e.g., by adjusting the dimensions of mold cavity 55) to compress material 52 within mold cavity 55 (represented in FIG. 2 as compression module 58). As shown, apparatus 50 is further configured to densify material 52 via a vacuum pressure infiltration (VPI) process (represented in FIG. 2 as vacuum pressure infiltration (VPI) module 60). For example, after material 52 is compressed within mold cavity 55 of mold 54, apparatus 50, using VPI module 60, may carry out one or more cycles of VPI to densify material 52 with pitch. Apparatus 50 may optionally be configured to process a material by needling or otherwise entangling portion of material 52 within mold cavity 55 (represented in FIG. 2 as needling module 62)

In general, compression module 58, VPI module 60, and needling module 62 are representative in FIG. 2 of the various structural features and components in apparatus 50 that allow apparatus 50 to perform each of the respective processing functions. Examples of the structural features and components represented by compression module 58, VPI module 60, and needling module 62 include those described herein with regard to each respective process.

Apparatus 50 includes mold 54, which defines mold cavity 55 that houses material 52 to be compressed and densified by apparatus 50. During operation of apparatus 50, compression module 58 may compress at least a portion of material 52 within mold cavity 55 by adjusting the volume of mold cavity 55 from a first volume to a second volume less than the first volume. After compressing material 52 in mold cavity 55, pitch 56 may be pressurized in mold cavity 55 of mold 54 to fill the pores of material 52. Apparatus 50 may pressurize the pitch in mold cavity 55 using VPI module 60. In this manner, apparatus 50 may be used to compress material 52 and to increase the density of the processed material by impregnating material 52 with pitch to form a C—C composite component. Optionally, prior to compressing material 52, needling module 62 may needle material 52 by retractably extending one or more needles into at least a portion of mold cavity 55 during operation of apparatus 50 to entangle material 52.

Mold 54 may include different ports for receiving pitch 56 (e.g., from an external apparatus for supplying pitch to mold cavity 55), venting air forced out of the pores of material 52 by pitch 56 during densification within mold cavity 55, receiving pressurized gas, evacuating gas to create a vacuum pressure in mold cavity 55, or the like. During operation of apparatus 50, mold cavity 55 of mold 54 may constrain material 52 by providing a bounded cavity for holding pressurized pitch 56. In some examples, mold 54 may be separate from and insertable into apparatus 50. In other examples, mold 54 may be a permanent part of apparatus 50.

While mold 54 is shown in FIG. 2 as defining a single mold cavity 55 for receiving material 52, in other examples, mold 52 may define a plurality of mold cavities each configured to receive a carbon material. In some examples, mold cavity 55 has a shape corresponding to a shape of a finished C—C composite component. For example, mold cavity 55 may have a shape substantially corresponding to a shape of an annular rotor disc or an annular stator disc (e.g., rotor disc 36 or stator disc 28 in FIG. 1). During processing within mold cavity 55 (e.g., after being compressed within mold cavity), material 52 may assume the shape of mold cavity 52 such that material 52 substantially corresponding to the finished component. In some examples, material 52 may optionally be machined to arrive at a desired shape.

As will be described in greater detail below with reference to FIGS. 4 and 5, mold 54 may include one or more features that are moveable such that the volume of mold cavity 55 may be adjusted during operation of compression module 58, e.g., by adjusting the dimensions of mold cavity 55. In one example, mold cavity 55 of mold 54 may be defined in part by top and bottom surfaces of mold 54. Compression module 58 may actuate the top surface of mold 54 and/or bottom surface of mold 54 relative to one another to reduce the volume of mold cavity 55. Depending on the volume of material 52, material 52 may be compressed in mold cavity 55 as compression module 58 actuates the top surface of mold 54 and/or the bottom surface of mold 54. In this manner, material 52 may be compressed in the mold cavity 55 by apparatus 50 to a desired fiber volume.

Apparatus 50 may be capable of processing a variety of different materials. In general, C—C composite components fabricated using apparatus 50 include carbon materials reinforced in a carbon matrix. Accordingly, material 52 may include, but is not limited to, woven and non-woven carbon-based fiber materials. The carbon-based fiber materials may, in some examples, be a continuous roving or continuous TOW materials. In some examples, the carbon-based fiber materials may include polyacrylonitrile (PAN) fibers. In other examples, the carbon-based fiber materials may include a pitch fiber, where the carbon fiber materials are fabricated from pitch material. Other types of fibers may also be used such as, e.g., carbonized rayon fibers and cellulose fibers.

Prior to being inserted into apparatus 50, material 52 may undergo processing to prepare the material for forming a C—C composite component. For example, material 52 may be carbonized prior to inserting material 52 into apparatus 50 to remove non-carbon elements (e.g., H, N, O, S, or the like) and other impurities from the carbon fiber material. Such a material may be referred to as a pre-carbonized material. Pre-carbonized materials that may be utilized include carbonized PAN fibers, carbonized pitch fiber, and carbonized rayon fibers.

In instances when material 52 is pre-carbonized, material 52 may be partially carbonized or fully carbonized prior to being place within mold cavity 55. In some examples, a fully carbonized material may exhibit a density between approximately 1.74 grams per cubic centimeter and approximately 1.78 grams per cubic centimeter, although other values are contemplated. By inserting a fully carbonized material into mold cavity 55 of apparatus 50, a separate carbonization processing step such as, e.g., a carbonization step performed during preform fabrication, may be eliminated during the fabrication of a C—C composite component.

Figure 3B:
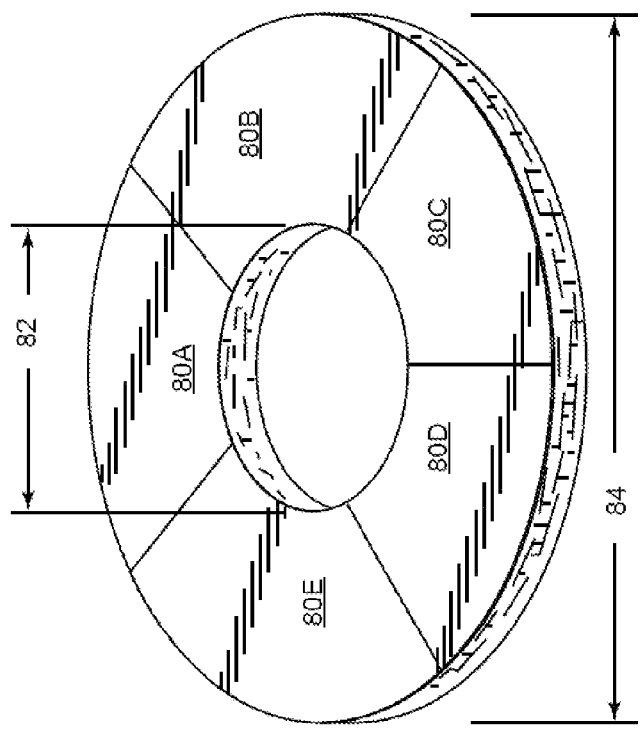
FIGS. 3A and 3B are conceptual diagrams illustrating of example segments of carbon fiber material that may be used in the example apparatus of FIG. 2.
Figure 3A:
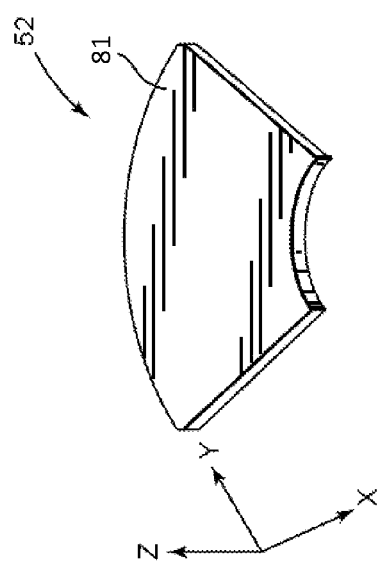

In additional examples, as described further with reference to FIGS. 3A and 3B, material 52 may initially include a plurality of segments layered on one another within mold cavity 55. Each segment of material 52 may be formed, for example, from a knitted, woven, and/or non-woven material. In some examples, a portion of the material may be needled together to define a segment. In some additional examples, a binder may be added to a portion of the material define a segment. For example, a binder such as, e.g., polyvinyl acetate or starch may be added to portion of material.

In some examples, a C—C composite material formed from layered segments of material 52 using apparatus 50 may exhibit increased mechanical strength compared to a C—C composite not formed from a plurality of layered segment. In some examples, using a plurality of layer segments to initially form material 52 may allow material 52 to withstand the force of pressurized pitch during a pitch densification cycle on apparatus 50 without shearing apart.

Apparatus 50 may be used to increase the density of material 52 within mold cavity 55. When initially inserted into mold cavity 55 of mold 54, material 52 may exhibit a relatively low fiber density (e.g., mass of fiber/volume of fiber) as compared to a finished C—C composite component. For example, material 52 may exhibit a fiber density between approximately 0.25 grams per cubic centimeter (g/cc) and approximately 1.75 g/cc before being inserted into mold cavity 55 for processing by apparatus 50. Finished C—C composite components (e.g., materials that have been compressed via compression module 58 and densified with pitch via VPI module 60), on the other hand, generally exhibit higher densities. In some examples, a finished C—C composite component may exhibit a density greater than 1.5 grams per cubic centimeter, such as, e.g., a density greater than 1.75 grams per cubic centimeter. The density of the C—C composite component may affect the performance of the component during subsequent operation such as, e.g., the ability of the component to withstand shear forces and thermal cycling. The increase in density may be attributed at least in part to the compression and pitch densification of material 52 after initially being inserted into mold cavity 55 of apparatus 50.

In some examples, after material 52 is inserted into mold cavity, compression module 58 may reduce the volume the dimensions of mold cavity (e.g., by changing the dimensions of mold cavity 55) to compress material 52, e.g., to increase the density of material 52 from that of the original density of material 52 when first placed in mold cavity 55. In some examples, compression module 58 may include a hydraulic press or other press (not shown in FIG. 2) for compressing material 52 in mold cavity 55 of mold 54 to increase the density of material 52. During operation, such press may apply a mechanical force to material 52 within mold cavity 55 of mold 54 to reduce the volume of material 52. For example, the press of compression module 58 may apply a mechanical force to material 52 by actuating or "pressing" two more separate surfaces of mold 54 together in a manner that reduces the volume of mold cavity 55. The mechanical force applied by compression module 58 may increase the packing density of material 52 by reducing the volume of mold cavity 55. As the volume of cavity 55 decreases, the volume of space occupied by material 52 increases, thereby increasing the fiber volume density of material 52 within cavity. In various examples, the press of compression module 58 may include a pneumatic cylinder, a hydraulic cylinder, or yet another mechanical actuating force such as, e.g., a ball and screw arrangement, used to compress material 52 in mold cavity 55.

Compression module 58 may compress material 52 to any suitable density. In some examples, compression module 58 may compact material 52 to a fiber volume density between approximately 15 volume percent material and approximately 50 volume percent material such as, e.g., between approximately 17 volume percent material and approximately 30 volume percent material. The fiber volume density may be calculated by dividing the amount of space occupied by the fibers of material 52 by the total amount of space occupied by material 52 (including air between the different fibers of material 52).

The amount of force applied to material 52 using compression module 58 may vary, e.g., based on the type of material 52 being used and the type of C—C composite component to be fabricated. That being said, in some examples, compression module 58 may be used to apply at least approximately 1.9 pounds per square inch (psi) to material 52 when compressing material 52 in mold cavity 55 with compression module 58. Other values are both possible and contemplated.

As noted above, in addition to or in lieu of processing material 52 using compression module 58, material 52 may be needled within mold cavity 55 of mold 54 using needling module 62 to entangle all or portion of material 52. Needling module 62 may include a single needle or a plurality of needles (e.g., two, three, four, or more) used to needle material 52. During operation, the needle(s) of needling module 62 may retractably extend into at least a portion of mold cavity 55 of mold 54 and through material 52. In some examples, one or more of the needles of needling module 62 may have a hooked distal end that extends into at least a portion of mold cavity 55 and through material 52. Upon being retracted, needles 62 may hook and/or entangle different fibers of material 52 on a downward stoke.

Needling may be useful to increase the mechanical strength of material 52 within mold cavity 55 prior to pitch densifying material 52 within mold cavity 55. For example, in instances where material 52 includes multiple different fibers that are randomly oriented or unconnected with respect to each other, the different fibers of material 52 may become separated from one another during pitch densification. This may reduce the strength of a resulting C—C composite component. However, by needling material 52 within mold cavity 55 with needles 62, material 52 may be entangled into a structure that resists separation during subsequent pitch densification. In some examples, such needling of carbon material may increase the number of fibers oriented in the z-direction (e.g., as labeled in FIG. 5).

Although apparatus 50 in the example of FIG. 2 includes needling module 62, apparatus 50 may compress material 52 within mold cavity 55 via compression module 58 and subsequently pitch densifying the compressed material within mold cavity 55 without needling material 52. For example, in situations where material 52 includes fibers that are too brittle or otherwise unsuitable for needling, apparatus 50 may nevertheless compress the carbon-fiber material and pitch densify the material within mold cavity 55. Accordingly, in some examples, apparatus 50 may not include needling module 62.

In examples where material 52 is needled in apparatus 50 by needling module 62, apparatus 50 may needle material 52 before or after material 52 is compressed by compression module 58. In some examples, needling material 52 before material 52 is compressed by compression module 58 may be useful because the material is less dense. A less dense material 52 may be more readily penetrated by needles 62 during needling than a more dense material 52 such as, e.g., a material that has been compressed by compression module 58 with mold cavity 55.

Independent of the specific processing steps performed on material 52 in mold cavity 55 prior to pitch densification, apparatus 50 may pitch densify material 52 by impregnating material 52 with pitch 56, e.g., using VPI module 60. Pitch 56 may be a hydrocarbon-rich material that may be extracted, e.g., from coal, tar, and petroleum. Pitch 56 may also be synthetically produced. In different examples, pitch 56 may come from a single source (e.g., coal) or may be a combination of different pitches from different sources. In some examples, pitch 56 may be a mesophase pitch. In other examples, pitch 56 may be an isotropic pitch. Combinations of mesophase and isotropic pitches are also contemplated.

Pitch 56 may have a melting temperature greater than typical ambient temperatures. As such, pitch 56 may be heated to a flowable state prior to densification of material 52. In some examples, as described in greater detail below with respect to FIGS. 6A and 6B, pitch 56 may be added to apparatus 50 in a solid state and then heated above the melting temperature in apparatus 50 during densification. In other examples, pitch 56 may be heated above the melting temperature separately from apparatus 50 and conveyed to mold cavity 55 of apparatus 50 as a melted pitch. In some examples, pitch 56 may be heated to a temperature between approximately 200 degrees Celsius and approximately 450 degrees Celsius such as, e.g., between approximately 275 degrees Celsius and approximately 330 degrees Celsius to melt into a flowable state.

Apparatus 50 in the example of FIG. 2 may densify material 52 in mold cavity 55 with pitch 56 using at least one cycle of VPI via VPI module 58. During a VPI cycle, mold cavity 55 may be reduced to vacuum pressure to evacuate the pores of material 52. In some examples, a vacuum pressure between approximately 1 torr and approximately 100 torr, such as, e.g., between approximately 10 torr and approximately 20 torr may be created. With the pores of material 52 ready to receive pitch 56, mold cavity 55 may be flooded with pitch 56. In examples where a portion of solid pitch is provided in apparatus 50, as will be described with reference to FIGS. 6A and 6B, flooding may be accomplished by heating pitch 56 above the melting temperature of pitch 56. In examples where pitch 56 is conveyed to apparatus 50 in a flowable state, flooding may be accomplished, e.g., by pressurizing a tank of pitch 56, mechanically conveying pitch 56, or allowing a vacuum pressure in mold cavity 55 to draw pitch 56 into mold cavity 55. After flooding, a gas such as, e.g., an inert nitrogen gas, can be used to pressurize pitch 56 in mold cavity 55. In some examples, a gas pressure between approximately 10 pounds per square inch (psi) and approximately 1000 psi, such as, e.g., between approximately 300 psi and approximately 700 psi may be used. Pressurization may help pitch 56 travel through the different pores of material 52. In this manner, apparatus 50 may be used to density a material through one or more cycles of VPI.

In some examples, as briefly noted above, material 52 may exhibit a density between approximately 0.25 grams per cubic centimeter (g/cc) and approximately 1.0 g/cc after being compressed and/or needled but prior to densification. After a cycle of VPI (60), material 52 may, in some examples, exhibit a density between approximately 1.35 grams per cubic centimeter and approximately 1.5 grams per cubic centimeter. A cycle of VPI carried out by VPI module 60 may be defined as a single densification during which perform 52 is infiltrated with pitch under one defined set of conditions (e.g., gas flow rates, temperature, time, etc.).

Apparatus 50 may densify material 52 with a single cycle of VPI or multiple cycles of VPI via VPI module 60 without removing material 52 from mold cavity 55. For example, apparatus 50 may densify material 52 via VPI module 60 until the material exhibits a density suitable for the C—C composite component being fabricated. In some examples, apparatus 50 may densify material 52 within mold cavity 55 until the material exhibits a density between approximately 1.6 grams per cubic centimeter and approximately 1.9 grams per cubic centimeter.

Although apparatus 50 in the example of FIG. 2 includes VPI module 60, in additional examples, apparatus 50 may be configured to densify material 52 using densification techniques other than vacuum pressure infiltration in addition to or in lieu of VPI module 60. In one example, apparatus 50 may densify material 52 in mold cavity 55 using one or more resin transfer molding (RTM) cycles. In general, a resin transfer molding cycle may involve actuating a ram (e.g., a hydraulic piston) through a cavity filled with pitch 56 to inject pressurized pitch into mold cavity 55 and through the different pores of material 52. In another example, apparatus 50 may densify material 52 using one or more vacuum-assisted resin transfer molding (VRTM) cycles. A vacuum-assisted resin transfer molding cycle may be considered a form of a RTM cycle in which a vacuum pressure is created in mold cavity 55 at least prior to the beginning of the RTM cycle. An example apparatus configured to pitch densify a material according to a selectable one of a plurality of different pitch densification techniques is described in commonly-assigned U.S. patent application Ser. Nos. 12/938,170 and 12/938,201, both entitled "APPARATUS FOR PITCH DENSIFICATION" which were filed on Nov. 2, 2010. The entire contents of both these applications are incorporated herein by reference.

While apparatus 50 may be configured to pitch densify material 52 using different pitch densification techniques in addition or in lieu of VPI cycle using VPI module 60, a VPI cycle may be comparatively gentler on material 52 than other types of densification cycles. Without being bound by any particular theory, it is believed that as pitch 56 initially infiltrates material 52, a pressure gradient is created across material 52. The pressure gradient causes internal stresses within material 52. If material 52 is not strong enough to accommodate the internal stresses, sections of material 52 may shear apart or different layers of material 52 may delaminate, destroying the shape and mechanical strength of material 52. This effect may be exacerbated when material 52 is not first processed into a preform, as according to some examples of the disclosure. However, by creating a vacuum pressure in mold cavity 55 at the beginning of a VPI cycle, backpressure inhibiting the free flow of pitch 56 into the different pores of material 52 may be reduced or eliminated. Further, the pressure applied on material 52 during the pressurization part of VPI cycle may be lower than the pressure applied on material 52 during other types of densification techniques such as, e.g., a RTM cycle. In this regard, VPI cycle may be useful for pitch densifying materials that are not first processed into preforms.

Apparatus 50 may be used to process materials that exhibit different sizes and shapes. The size and shape of the materials may vary, e.g., based on the size and shape of mold cavity 55 and the size and shape of the C—C composite component being fabricated. However, in some examples, material 52 may be processed to define a shape substantially corresponding to a shape of a finished component before being inserted into mold 54 of apparatus 50. In some additional examples, material 52 may be processed into one or more discrete segments before being inserted into mold 54 of apparatus 50. Processing material 52 into discrete segments may add mechanical strength to material 52 and may help facilitate placement of material 52 into apparatus 50.

FIGS. 3A and 3B are schematic drawings of example segments of material 52 that may be inserted into apparatus 50 for processing and subsequent pitch densification. FIG. 3A illustrates an example individual segment of carbon material 81 (also referred to as "individual segment 81") that is fabricated from material 52 and that is configured (e.g., size and shaped) to be inserted into mold cavity 55 of mold 54. FIG. 3B illustrates a plurality of segments 80A-80E of material (collectively referred to as "segments 80") that are fabricated from material 52 and that together define a shape generally corresponding to a shape of a finished C—C composite component, which in the example of FIG. 3B is a brake disc rotor or brake disc stator. Each of segments 80 (FIG. 3B) may be the same or substantially similar to that of individual segment 81 (FIG. 3A).

Segments 80 may be fabricated using any suitable technique. In one example, a portion of material (e.g., a knitted, woven, or non-woven material) may be precut or otherwise preprocessed into a desired shape for insertion into cavity 55 of mold 54. Example of individual segments formed form non-woven material may include needled fibers, materials with binders such as polyvinyl acetate (PVA) or starch, binder fibers (such as polypropylene, polyethylene), air entangled material, and water jet entangled materials.

While the disclosure is not limited to segments 80 having any particular dimensions, in some examples, each of segments 80 may be sized and shaped to generally correspond to a size and shape of a finished C—C composite component (or portion thereof) when assembled in mold cavity 55. In one example, a finished component may be a brake rotor disc or a brake stator disc that defines a substantially annular shape (e.g., rotor disc 36 or stators disc 38 in aircraft brake assembly 10 of FIG. 1). In such an example, segments 80 may be sized and shaped to substantially correspond to a size and shape of rotor disc 36 or stators disc 38 when segments 80 are assembled. In some examples, segments 80 in the example of FIG. 3B combine together to define an annular shape that has an inner diameter 82 and an outer diameter 84. In some examples, inner diameter 82 may range between approximately 6 inches and approximately 13 inches, while outer diameter 84 may range between approximately 9 inches and approximately 25 inches. However, other values are both possible and contemplated.

Segment 81 may define any suitable shape. In examples where segment 81 is used in combination with other segments to define an annular shape, segment 80 may define a lesser portion of an annulus. For example, segment 81 may define a generally trapezoidal shape with arcuate bases. In additional examples where segment 81 is used in combination with other segments, each segment may be design to overlap with another segment when placed in mold cavity 55 of mold 54.

Overlapping different segments of material 52 in mold cavity 55 may create an interlocked structure that resists separation during pitch densification.

Segment 80 in the example of FIG. 3A defines a thickness in the Z-direction indicated on FIG. 3A. Apparatus 50 may be capable of compressing and/or needling and pitch densifying segments 80 of material 52 that has any suitable thickness. One or multiple layers of segments 80 may be used to form the thickness of material 52. In some examples, the overall thickness of material 52 suitable for forming a C—C composite component. In these examples, the overall thickness of material 52 may range between approximately 0.25 inches and approximately 2 inches, although other values are possible. In examples, in which multiple overlapping layers of segments form material 52, the thickness of the individual segments may range between approximately 0.05 inches and approximately 0.20 inches. While the foregoing description included example shapes and dimensions for material 52, is should be appreciated that other shapes and dimensions are contemplated and that the disclosure is not limited to using a material that has any particular size or that defines any particular shape.

Figure 4A:
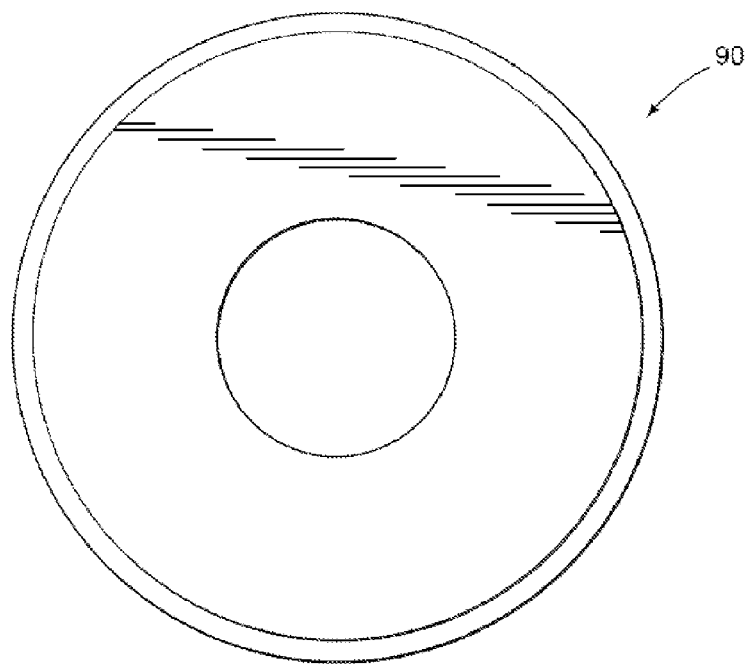
FIGS. 4A and 4B are conceptual diagrams illustrating example surfaces that may be combined to form an example mold cavity for an example mold that may be used with the example apparatus of FIG. 2.
Figure 4B:
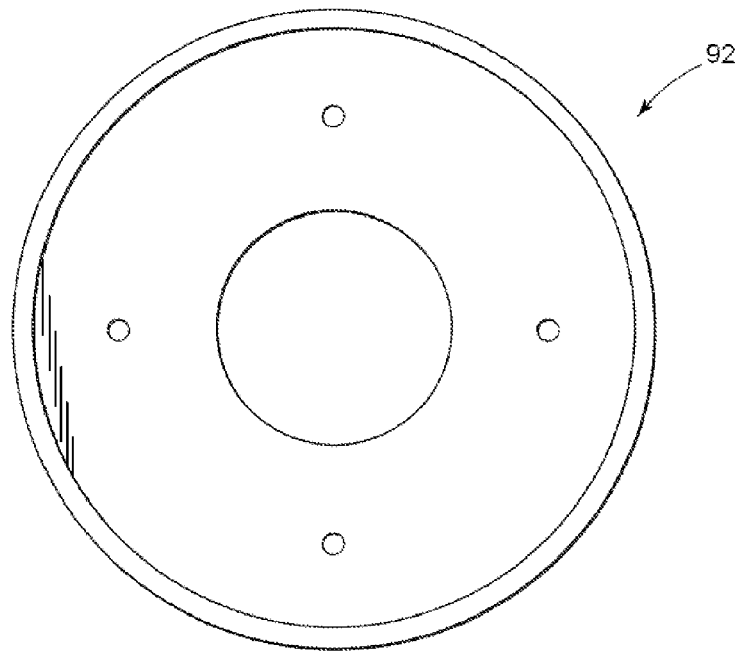

As noted with reference to FIG. 2, mold 54 is configured to receive material 52 within mold cavity 55. The specific shape and size of mold cavity 55 may vary, e.g., based on the shape and size of the C—C composite component to be formed by apparatus 50. FIGS. 4 and 5 illustrate different example views of one example of mold 54 in accordance with the disclosure. FIGS. 4A and 4B are conceptual diagrams illustrating a first portion 90 and second portion 92, respectively, that define mold cavity 55. FIG. 5 is a conceptual diagram illustrating an example mold cavity 55 defined at least in part by the first and second portions 90, 92 of FIGS. 4A and 4B, respectively.

Figure 5:
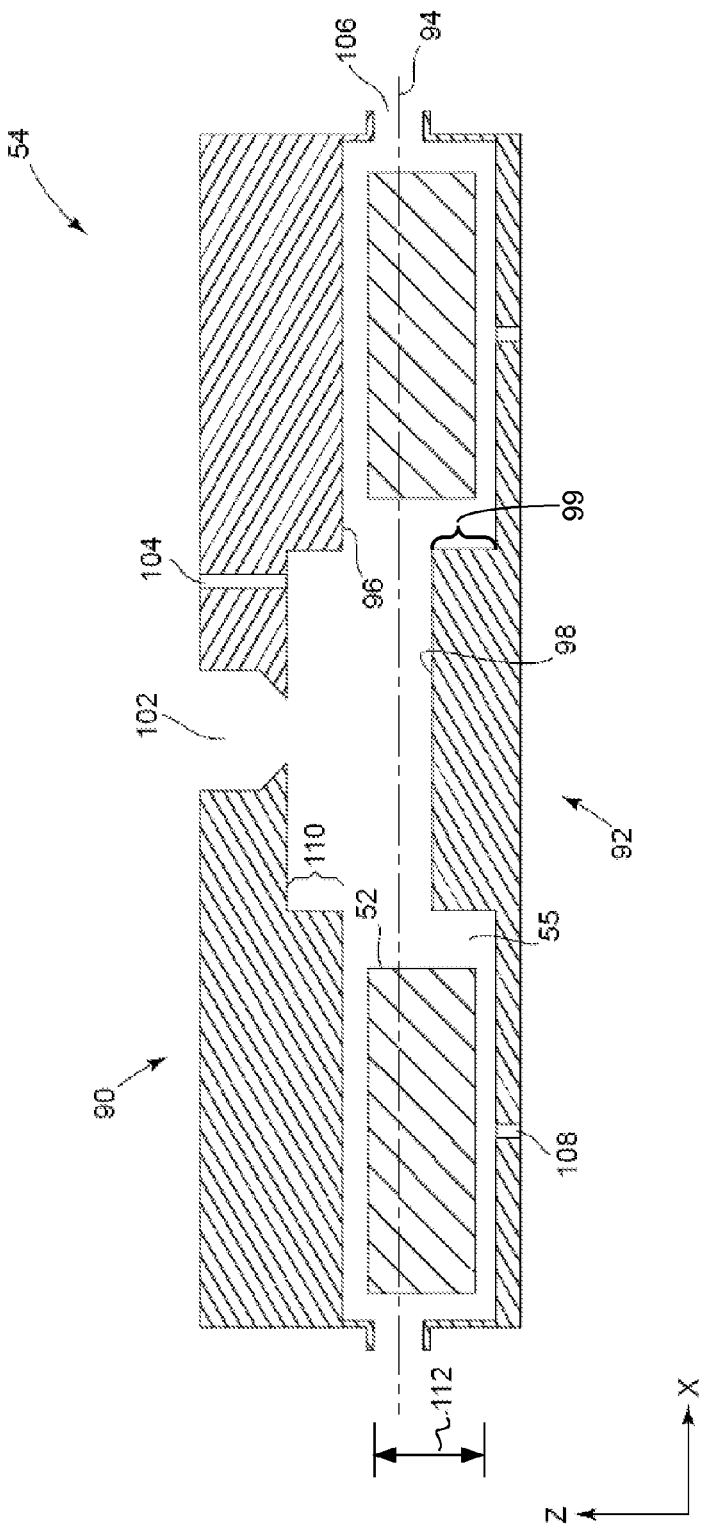
FIG. 5 is a conceptual diagram illustrating a cross-sectional view of the example mold cavity.

In the example of FIGS. 4 and 5, mold cavity 55 is defined by generally opposing surfaces of first portion 90 and second portion 92. First portion 90 and second portion 92 are separable at parting line 94, e.g., to open mold 54 for adding or removing material 52. First portion 90 defines a top surface 96, and second portion 92 defines a bottom surface 98 opposite top surface 96. In general, mold cavity 55 may be configured to receive material 52. For example, in operation, material 52 may be placed in mold cavity 55 on bottom surface 98 and then first portion 90 may be placed over material 52. First portion 90 and second portion 92 may be moved relative to each other (e.g., by press of compression module 58 (FIG. 2)) to compress material 52 within mold cavity 55. Upon compressing material 52 in mold cavity 55 of mold 54, mold 54 may define a bounded area for pitch densifying material 52.

During the operation of apparatus 50, the pressure in mold cavity 55 may be varied from vacuum pressure to above ambient pressure, pitch 56 may added to mold cavity 55, and air in the pores of material 52 may be vented during densification. To provide fluid communication for processing material 52, mold 54 may include different fluid access ports to cavity 55. In the example of FIG. 5, mold 54 includes pitch port 102, pressure port 104, and vent ports 106. Pitch port 102 may be in fluid communication with a pitch source for supplying melted pitch 56 to mold cavity 55 during a pitch densification cycle. Pressure port 104 may be in fluid communication with a gas source to adjust the pressure within mold cavity 55 during a VPI cycle. Vent ports 106 may be in fluid communication with a vacuum source to create a vacuum pressure in mold cavity 55 during a VPI cycle or a venting line to vent air from material 52 within mold cavity 55 as melted pitch infiltrates the pores of material 52.

As noted above, apparatus 50 may be capable of needling material 52 in mold cavity 54 via needling module 62. During needling operation, needle(s) may retractably extend into at least a portion of mold cavity 55 of mold 54 and through at least a portion of material 52 to entangle different fibers of material 52. To accommodate needling in these examples, mold 54 may include needle apertures 108. Needle apertures 108 define openings that allow needles to retractably extend into mold cavity 55. Needle apertures 108 may extend through first portion 90 of mold 54, second portion 92 of mold 54, or both first portion 90 and second portion 92 of mold 54, although in the example of FIGS. 4 and 5, needle apertures 108 extend through second portion 92 of mold 54. Mold 54 may include a single needle aperture 108 or a plurality (e.g., two, three, four, or more) of needle apertures 108. In some examples, mold 54 may include between approximately 5 needle apertures per square inch and approximately 10 needle apertures per square inch.

As noted above, during the operation of apparatus 50, material 52 may be compressed in mold cavity 55 of mold 54 using compression module 58 (FIG. 2). In some examples, a press may actuate first portion 90 relative to second portion 92 in the Z-direction (as indicated in FIG. 5) to reduce the volume of mold cavity 55 and compress material 52 in mold cavity 55. During such an operation, top surface 96 and bottom surface 98 may directly or indirectly contact material 52 to compress material 52 in mold 54

In some examples, first portion 90 may define a recess 110 that projects into the plane of top surface 96, and second portion 92 may define a mated protrusion 99 extending out of the plane of bottom surface 98. Recess 110 may be sized and shaped such that recess 110 mates with protrusion 99 when first portion 90 of mold 54 is actuated against second portion 92 to reduce the volume of mold cavity 55 and/or seal mold cavity 55. In other examples, first portion 90 may define a substantially planar top surface 96 that mates with protrusion 99 of second portion 92 when first portion 90 of mold 54 is moved relative to second portion 92 of mold 54 to seal mold cavity 55. In general, although mold 54 in the example of FIG. 5 includes recess 110 and protrusion 99, it shall be appreciated that the disclosure is not limited in this respect, and in other examples, the techniques of the disclosure may be implemented with mold configurations other than those described herein.

As seen in FIG. 5, in some examples, material 52 in mold cavity 55 may be compressed by reducing the Z-direction thickness 112 of material 52 within mold cavity 55. During compression, the fiber volume density of material 52 may increase within mold cavity 55 as air is removed from between the different fibers of material 52. For example, after compression, material 52 may exhibit a fiber volume density between approximately 15 percent and approximately 50 percent such as, e.g., between approximately 24 percent and approximately 28 percent, where the fiber volume density may be calculated by dividing the amount of space occupied by the fibers of material 52 by the total amount of space occupied by material 52 (including air between the different fibers of material 52). It should be appreciated, however, that the foregoing values are merely examples, and an apparatus in accordance with the disclosure may compress material 52 to densities other than those indicated above.

Figure 6A:
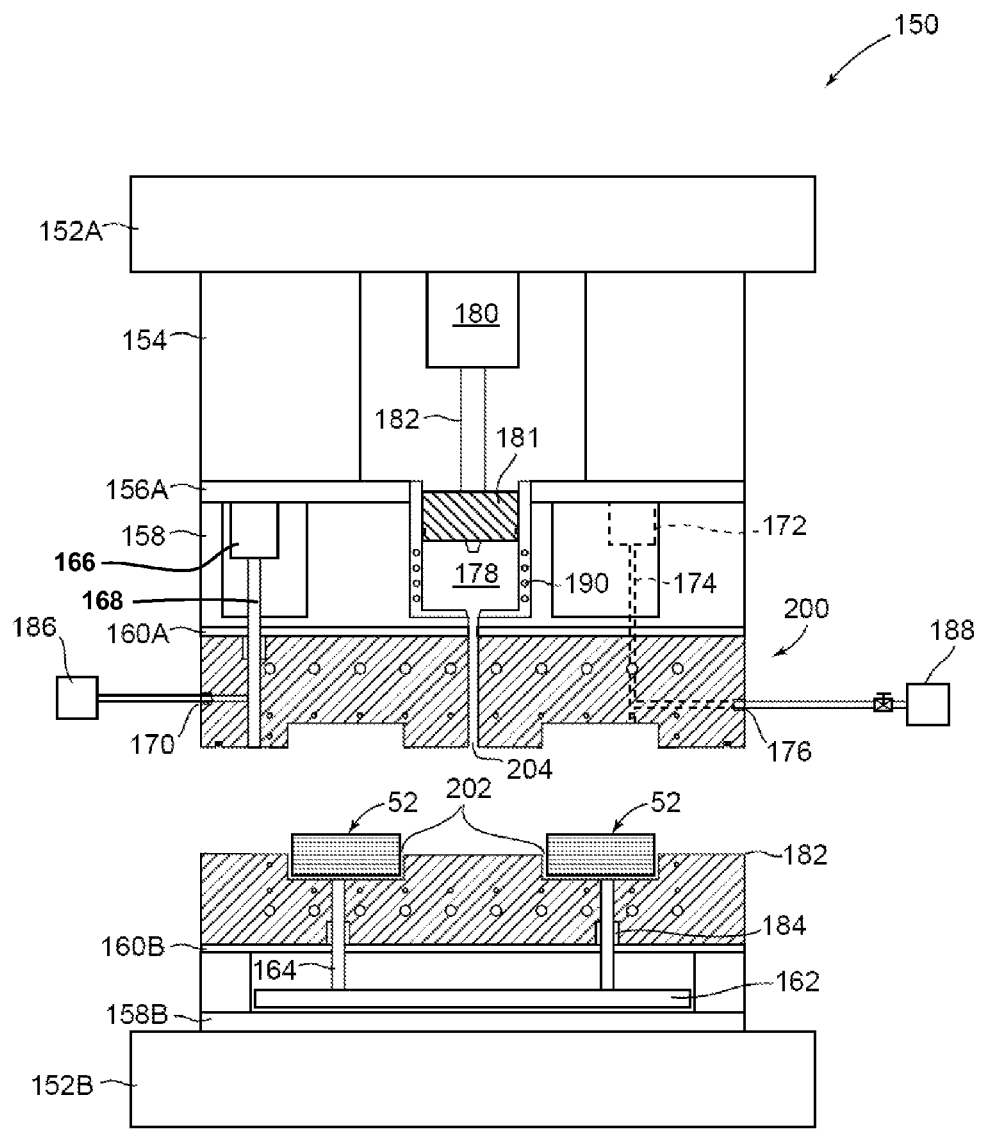
FIGS. 6A and 6B are schematic diagrams illustrating an example apparatus configured to process and pitch densify a carbon fiber material.
Figure 6B:
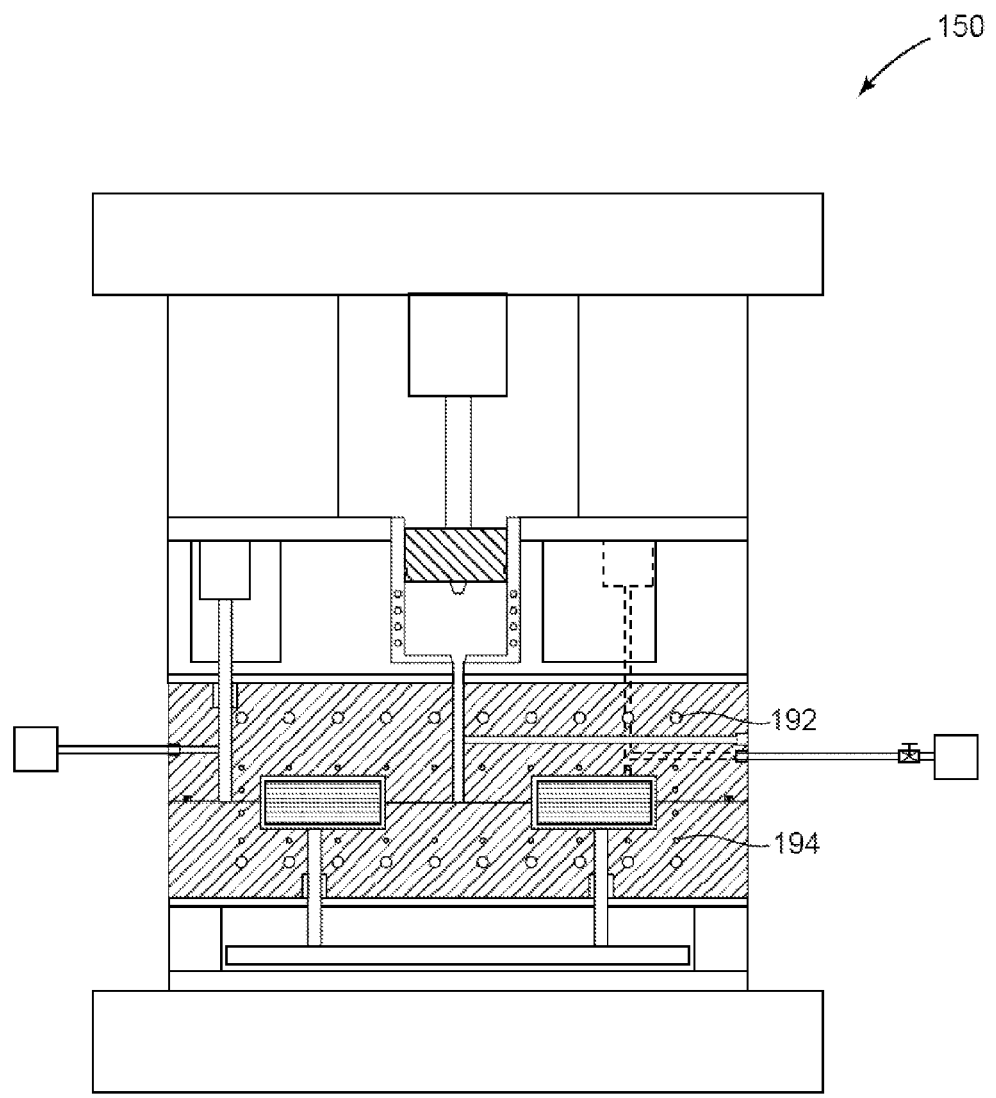

FIGS. 6A and 6B are conceptual drawings illustrating an example pitch densification apparatus 150. Pitch densification apparatus 150 is configured to receive a carbon fiber material within mold cavity 202, compress the carbon fiber material, and densify the compressed carbon fiber material with pitch. Although apparatus 150 does not include features corresponding to needling module 62 (FIG. 2), apparatus 150 is otherwise an example of apparatus 50 (FIG. 2) and illustrates various components that may be included in apparatus 50. FIG. 6A is a conceptual diagram illustrating apparatus 150 with mold cavity 202 in an open position. While in an open position, material 52 may be inserted into mold cavity 202 or material 52 may be removed from mold cavity 202 after it has been compressed and/or densified. FIG. 6B is a conceptual diagram illustrating apparatus 150 with mold cavity 202 in a closed position. While in a closed position, material 52 in mold cavity 202 may be densified with pitch, e.g., after material 202 has been compressed within mold cavity 202.

As shown, apparatus 150 includes press platen 152A and 152B, bolster 154, clamp plates 156A and 156B, backing plate 158, insulating plates 160A and 160B, bolster ejector plate 162, ejector pins 164, vacuum line control cylinder 166, vacuum line control rod 168, vacuum port 170, gas feed control cylinder 172, gas control rod 174, gas port 176, pitch chamber 178, pitch feed cylinder 180, and pitch feed ram 181. Mold 200 is interposed between insulating plates 160A and 160B. Mold 200 defines mold cavity 202, which houses material 52.

In general, press platens 152A and 152B move relative to one another to compress material 52 in mold cavity 202 of mold 200. During operation, press platens 152A and 152B apply pressure from opposing directions to constrain material 52 in mold cavity 202. One or both of press platens 152A and 152B may be connected to a mechanical actuating feature (not shown) such as, e.g., a pneumatic cylinder, a hydraulic cylinder, a ball and screw arrangement, or the like. As such, one or both of press platens 152A and 152B may move in the Z-direction illustrated in FIGS. 6A and 6B to allow mold 200 to open at a mold parting line sealed by mold parting seal 194, e.g., to insert or remove material 52 from mold cavity 202 of mold 200. Press platens 152A and 152B may be integrally formed (i.e., permanently connected) with other features of apparatus 150, or press platens 152A and 152B may be separate features, as illustrated in FIGS. 6A and 6B. In other words, press platens 152A and 152B may be purpose-built or may be part of a standard press to which other components of apparatus 150 are added.

Press platen 152A and 152B are connected to bolster 154 and clamp plate 156B, respectively. In turn, bolster 154 is connected to clamp plate 156A, while clamp plate 156B is connected to bolster ejector plate 162. In general, bolster 154 and bolster ejector plate 162 may function to define cavities for receiving and housing various features of apparatus 150. For example, bolster 154 defines pitch chamber 178 and bolster ejector plate 162 defines cavities to receive ejector pins 164. Bolster 154 and bolster ejector plate 162 may protect the various features from the pressing force of press platens 152A and 152B during operation of apparatus 150.

Clamp plates 156A is interposed between bolster 154 and backing plate 158. Clamp plate 156B, by contrast, is interposed between bolster ejector plate 162 and insulating plate 160B. Clamp plates 156A and 156B function to clamp different features of apparatus 150 from moving out of alignment.

Apparatus 150 includes backing plate 158 interposed between clamp plate 158A and insulating plate 160A. Backing plate 158 defines cavities for receiving and housing various features of apparatus 150. For example, backing plate 110 defines pitch chamber 178, as well as cavities to receive vacuum line control cylinder 166, vacuum line control rod 168, gas feed control cylinder 172, and gas control rod 174. Backing plate 158 may protect the different features from the pressing force of press platens 152A and 152B during operation of apparatus 150.

Mold 200 is located between insulating plates 160A and 160B. Insulating plates 160A and 160B may limit thermal transfer away from mold 200, e.g., to help mold 200 retain heat during pitch densification. Accordingly, insulating plates 160A and 160B may, in some examples, be formed from a low thermal conductivity material. To further limit thermal transfer away from mold 200, connection lines extending between mold 200 and other features of apparatus 150 may, in some examples, be provided with insulating seals 184, as shown in FIGS. 6A and 6B. Insulating seals 184 may prevent thermal transfer through openings in insulating plates 160A and 160B.

Similar to that of mold 54 (FIG. 2), mold 200 defines one or more mold cavities 202 that receive material 52 to be compressed and pitch densified using apparatus 150. Mold 200 may be formed of soft tooling materials such as, e.g., a polyester or an epoxy polymer. Alternatively, mold 200 may be formed of hard tooling materials such as, e.g., cast or machined aluminum, nickel, steel, titanium, or the like. Mold 200 may define different channels for conveying pitch, venting air, drawing a vacuum, receiving pressurized gas, or the like to mold cavity 200.

During one or more pitch densification cycles, a vacuum pressure may be created in mold cavity 202 for at least part of the densification cycle. Accordingly, apparatus 150 may include vacuum hardware connectable to a vacuum source to create a vacuum pressure in mold cavity 202. In the example of FIGS. 6A and 6B, vacuum hardware is provided by vacuum line control cylinder 166, vacuum line control rod 168, and vacuum port 170. Vacuum port 170 provides a connection point between vacuum source 186, which is operable to create a vacuum in mold 200, and in particular mold cavity 202, that contains material 52. Vacuum line control cylinder 166 is connected to vacuum line control rod 168. In operation, vacuum line control rod 168 may be controllably actuated in the Z-direction shown on FIGS. 6A and 6B to selectively place vacuum source 186 in pressure communication with mold cavity 202, thereby controlling a vacuum pressure created in mold cavity 202. In different examples, vacuum line control cylinder 166 may be a single acting cylinder, which uses a compressible fluid to actuate vacuum line control rod 168 in one direction and a spring to return vacuum line control rod 168 to a return position, or a double acting cylinder, which uses a compressible fluid to both extend and return vacuum line control rod 168. In different assemblies according to the disclosure different vacuum control hardware may be used, and the disclosure is not limited in this respect.

From time to time, a pressurized gas may be applied to pitch in mold cavity 202 to help densify material 52, e.g., during a VPI cycle. To control the pressurized gas, apparatus 150 may include gas control hardware connected to a pressurized gas source. In the example of FIG. 6A, for instance, apparatus 150 includes gas feed control cylinder 172, gas control rod 174, and gas port 176. Gas port 176 connects gas source 188, which supplies pressurized gas, to mold cavity 202 that contains material 52. In various examples, gas source 188 may be a source of pressurized inert gas including, but not limited to, nitrogen, helium, argon, carbon dioxide, or the like. Gas control rod 174 is connected to gas feed control cylinder 172. In operation, gas control rod 174 may be controllably actuated in the Z-direction shown on FIGS. 6A and 6B to selectively place gas source 188 in fluid communication with mold cavity 202, thereby controlling a gas pressure created in mold cavity 202. In different examples, gas feed control cylinder 172 may be a single acting cylinder or a double acting cylinder, as discussed above with respect to vacuum line control cylinder 166. Further, as similarly discussed above with respect to the vacuum control hardware in apparatus 150, in different assemblies according to the disclosure, different features may be used to control pressurized gas flow to mold cavity 202, and the disclosure is not limited in this respect.

In the example of FIGS. 6A and 6B, melted pitch is supplied to mold cavity 202 from pitch chamber 178 through pitch port 204. Pitch chamber 178 is thermally connected to heating source 190. In operation of apparatus 150, a portion of solid pitch material may be inserted into pitch chamber 178. Heating source 190 may thereafter melt the portion of solid pitch into a flowable state in pitch chamber 178. In some examples, heating source 190 may include a thermal transfer agent that is passed through a tube thermally connected to pitch chamber 178 (e.g., similar to a heat exchanger). The thermal transfer agent may be heated in apparatus 150 or conveyed to apparatus 150 (e.g., from an external furnace, heat exchange, or the like). In other examples, heating source 190 may be a fired burner, an electrical resistance heater, a radio frequency (e.g., microwave) heater, or the like. In still other examples, heat source 190 may be a convection heating source, an electromagnetic induction heating source, or an infrared heating source.

To control pitch delivery to mold cavity 202, apparatus 150 may also include pitch flow control features. For example, apparatus 150 includes pitch feed cylinder 180 and pitch feed ram 181. Pitch feed cylinder 180 is mechanically connected to pitch feed ram 181. In operation, pitch feed cylinder 180 may controllably actuate pitch feed ram 181 in the Z-direction shown on FIGS. 6A and 6B into pitch chamber 178. In this manner, pitch feed ram 181 may force melted pitch in pitch feed chamber 178 through pitch port 204 and into mold cavity 202. In different examples, pitch feed cylinder 180 may be a pneumatic cylinder, a hydraulic cylinder, a ball and screw arrangement, or the like. Further, pitch feed ram 181 may be a piston, a plunger, or another device for applying a mechanical compression force to melted pitch in pitch chamber 178.

After processing and pitch densifying material 52 on apparatus 150, pressure may be released from press platens 152A and 152B to allow mold 200 to be opened. In some examples, mold 200 may be removed from apparatus 150 before opening the mold to extract a densified material. In other examples, a portion of mold 200 may be opened while mold 200 resides in apparatus 150. For example, in FIGS. 6A and 6B, mold 200 may be opened in apparatus 150 on a parting line sealed by parting seal 194. To facilitate removal of a densified material in these examples, apparatus 150 may include ejector pins 164. Ejector pins 164 may be controllably actuated in the Z-direction shown in FIGS. 6A and 6B to help eject densified material from mold 200.

In operation, apparatus 200 may be used to compress material 52 in mold cavity 202 and to densify the compressed material in the same mold cavity 202 of mold 200 using a VPI cycle, as described above with respect to apparatus 50 in FIG. 2. For example, during operation, material 52 may be inserted into mold cavity 202 of mold 200 and solid pitch may be inserted pitch chamber 178. Press platens 152A and 152B may move relative to each other to compress material 52 in mold cavity 202 and to seal mold 200 for pitch densification. Heating source 190 may melt the solid pitch in pitch chamber 178 to a flowable state. During a VPI cycle, the pressure in mold cavity 202 may be reduced to vacuum by controlling vacuum line control cylinder 166 to actuate vacuum line control rod 168. Upon actuating vacuum line control rod 168, mold cavity 202 may be placed in pressure communication with vacuum source 186 through vacuum port 170. Thereafter, pitch feed cylinder 180 may extend pitch feed ram 181 into pitch chamber 178 to force melted pitch through pitch port 204 and into mold cavity 202. With mold cavity 202 filled with pitch, vacuum line control cylinder 166 may control vacuum line control rod 168 to close vacuum port 170. Thereafter, gas feed control cylinder 172 may control gas control rod 174 to open gas port 176, placing mold cavity 202 housing material 52 in communication with pressurized gas source 188. In this manner, material 52 may be compressed in mold cavity 202 and thereafter pitch densified via a VPI cycle within the same mold cavity 202 of apparatus 150.

Apparatus 150, as outlined above, may include features for processing a carbon-based fiber material and pitch densifying the processed material. As shown, apparatus 150 may be a modular assembly configured to be used with standard press platen 152A and 152B. That is, apparatus 150 may include different modular components configured to be assembled and inserted between press platens to form apparatus 150. In different examples, however, apparatus 150 may include different modular components or non-modular components in addition to or in lieu of the components illustrated and described with respect to FIGS. 6A and 6B. Therefore, although apparatus 150 includes various example components, different configuration are contemplated.

As an example of the additional or different features that may be included in an apparatus according to the disclosure, FIGS. 6A and 6B illustrate example thermal management features that may be included in apparatus 150 for controlling the temperature of mold 200, particularly to control temperature of material 52 and/or pitch within mold cavity 202. Because pitch is generally solid at ambient temperatures, an apparatus that includes thermal management features may help melt pitch or keep pitch in a flowable state until the pitch suitably permeates the various pores of material 52.

In the example of FIGS. 6A and 6B, apparatus 150 includes heater tubes 192 and cooling tubes 194 for heating and cooling, respectively, mold 200. Heater tubes 192 may extend through at least a portion of mold 200 and be in thermal communication with mold 200. Heater tubes 192 may define a conduit configured for fluid communication with a thermal transfer agent. A thermal transfer agent may include, but is not limited to, steam, oil, a thermal transfer fluid, or the like. Heater tubes 192 may be cast or machined into mold 200, or may be inserted into apertures defined by mold 200. Heater tubes 192 may be formed of a thermally conductive material including, but not limited to, copper, aluminum, and alloys thereof. In operation, a thermal transfer agent may be heated in apparatus 150 or externally to apparatus 150 (e.g., in a furnace or heat exchanger) and conveyed through heater tubes 192. The heat of the thermal transfer agent may conduct through heater tubes 192, mold 200, and material 52. In this way, heater tubes 192 may conductively heat mold 200, including material 52 and pitch in mold cavity 202. In various examples, a thermal transfer agent may be heated to a temperature greater than 110 degrees Celsius such as, e.g., to a temperature between approximately 285 degrees Celsius and approximately 330 degrees Celsius during a pitch densification cycle of apparatus 150.

After completing one or more pitch densification cycles on apparatus 150, material 52 may be saturated with liquid pitch and excess pitch may remain in mold cavity 202. To facilitate easy and rapid removal of a densified material from apparatus 150, cooling tubes 194 may be provided on apparatus 150 to cool and solidify melted pitch. In some examples, heater tubes 192 may be used as cooling tubes by conveying a comparatively cool thermal transfer agent through heater tubes 192 after densification. In other examples, however, apparatus 150 may include separate cooling tubes 194. Separate heating tubes 192 and cooling tubes 194 may allow apparatus 150 to operate faster than when apparatus 150 includes shared heating and cooling tubes by reducing thermal cycling times.

Cooling tubes 194 may be similar to heating tubes 192 in that cooling tubes 194 may extend through at least a portion of mold 200 and may be in thermal communication with mold 200. Cooling tubes 194 may also define an aperture configured for fluid communication with a thermal transfer agent, which may be the same thermal transfer agent received by heater tubes 192 or a different thermal transfer agent. In operation, the thermal transfer agent may be conveyed through cooling tubes 194. As a result, mold 200, including material 52 and pitch in mold cavity 202, may be conductively cooled by cooling tubes 194.

Figure 7:
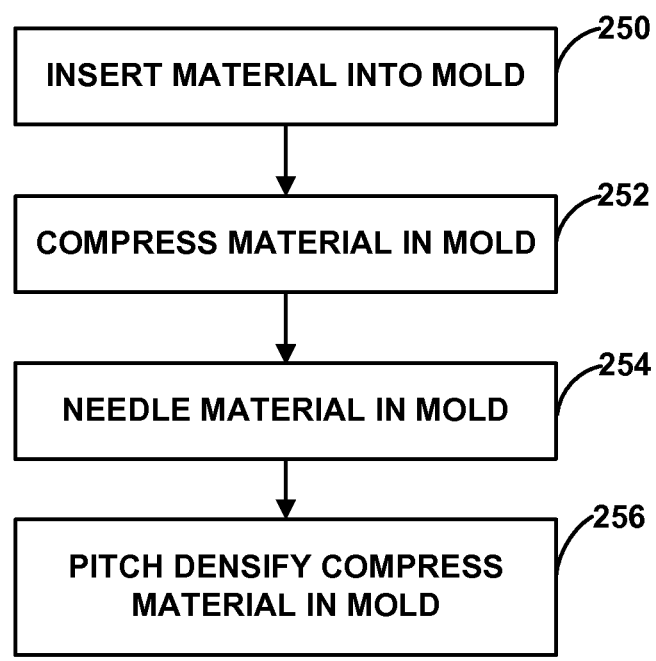
FIG. 7 is a flow diagram of an example method for processing and pitch densifying a material within a single apparatus.

Different example material structures, molds and apparatuses have been described in relation to FIGS. 2-6. FIG. 7 is a flow diagram illustrating an example method for processing a material with an apparatus configured to compress, needle, and pitch densify a material. For ease of description, the method of FIG. 7 is described as executed by apparatus 50 (FIG. 2). In other examples, however, the method of FIG. 7 may be executed by apparatus 150 (FIGS. 6A and 6B) or apparatuses with different configurations, as described herein.

As shown in FIG. 7, carbon fiber material 52 may be inserted into mold cavity 55 of densification apparatus 50 (250), compression module 58 may compress material 52 in mold cavity 55 (252), and needling module 62 may retractably extend one or more needles into at least a portion of mold cavity 55 to entangle different fibers of material 52 within the mold cavity (254). After suitably processing material 52 in mold cavity 55, apparatus 50 may then carry out one or more VPI cycles via VPI module 60 to pitch densify material 52 within mold cavity 55 of mold 54 (256).

As shown in FIG. 7, material 52 may be inserted into mold cavity 55 of mold 54 of pitch densification apparatus 50 (250). As described above, mold 54 may be removable from pitch densification apparatus 50 or permanently formed with pitch densification apparatus 50. In some examples, mold cavity 55 may have a shape substantially corresponding to a shape of a finished component formed from material 52. For example, mold cavity 55 may have a shape substantially corresponding to brake rotor disc 36 or brake stator disc 38 (FIG. 1). Mold 54 may be formed of two or more separable portions that may be separated to insert material 52 into mold cavity 55. Material 52 may be a carbon-based fiber material, a carbon-based non-fiber material, or a non-carbon-based material. In some examples, material 52 may be pre-carbonized. In some additional examples, material 52 may be fabricated into a plurality of discrete segments that may be separately inserted into mold cavity 55. In still some additional examples, mold 54 may be preheated, e.g., to a temperature greater than 110 degrees Celsius, before inserting material 52 into mold cavity 55.

Material 52 may be compressed within mold cavity 55 (252) after being inserted into mold cavity 55 (250). Compression module 58 may apply a mechanical force to material 52 to compress the material within mold cavity 55. In some examples, compression module 58 may include press platen or another feature that compresses material 52 in mold cavity 55, e.g., by compacting material 52 against bottom surface of the mold. In some examples, mold 54 may include one or more features that actuate in response to pressure from compression module 58. Although compression module 58 may compress material 52 to any suitable density within mold 54, on some examples, compression module 58 may compress material 52 to a fiber volume density between approximately 17 volume percent material and approximately 30 volume percent material.

Optionally, material 52 may be needled within mold cavity 55 via needling module 62 (254). During a needling operation, one or more needles of needling module 62 may retractably extend into at least a portion of mold cavity 55 and material 52 within mold cavity 55 (254). In some examples, the one or more needles may include hooked distal ends that hook different fibers of material 52 when the one or more needles are inserted into material 52. Needles 262 may entangle different fibers of material 52 within mold cavity 55. Entangled fibers may resist separation during subsequent pitch densification. Although the example of FIG. 7 includes needling of material 52 after material 52 is compressed (252), material 52 may be additionally or alternatively needled prior to being compressed in mold cavity 55. Further, as noted above, in some examples, material 52 is not needled in mold cavity 55.

After compressing material 52 within mold cavity 55 (252) and needling material 52 within mold cavity 55 (254), material 52 may be densified with pitch within mold cavity 55 using a VPI cycle (256). During a VPI cycle, mold cavity 55 of mold 54 may be reduced to vacuum pressure to evacuate the pores of material 52. Mold cavity 55 may then be flooded with melted pitch. After flooding, a gas such as, e.g., an inert nitrogen gas, may be used to pressurize the pitch within mold cavity 55. In this manner, apparatus 50 may be used to density a material through one or more cycles of VPI. Overall, in the example of FIG. 7, material may be compressed, needled, and densified with pitch all within mold cavity 55 of apparatus.

By processing a material and then pitch densifying the processed material within the same apparatus, the technique of FIG. 7 may allow apparatus 50 to process materials that may not otherwise be fabricated into a preform and then pitch densified on a separate apparatus. For instance, in some examples, apparatus 50 may be used to process a pre-carbonized carbon fiber material or a pitch fiber material that may lack sufficient mechanical strength to be fabricated into a preform. In some examples, the use of such materials may eliminate carbonization processing such as, e.g., a carbonization step performed during fabrication of a preform, that may otherwise be performed during the fabrication of a C—C composite component.

Various examples have been described. These and other examples are within the scope of the following claims.

The invention claimed is:

1. A method comprising:
   inserting a carbon fiber material in a mold cavity of an apparatus, wherein the apparatus is configured to densify the carbon fiber material with pitch within the mold cavity using a vacuum pressure infiltration cycle;
   prior to introducing the pitch in the mold cavity to densify the carbon fiber material, compressing the carbon fiber material in the mold cavity to increase the fiber volume fraction of the carbon fiber material in the mold cavity by adjusting the mold cavity from a first volume to a second volume less than the first volume; and
   subsequently introducing the pitch into the mold cavity to densify the compressed carbon fiber material with the pitch in the mold cavity using the vacuum pressure infiltration cycle.

2. The method of claim 1, wherein the carbon fiber material to be densified comprises at least one of a carbonized polyacrylonitrile fiber or a pitch fiber.

3. The method of claim 1, wherein the carbon fiber material comprises a fiber material formed into a plurality of segments, and wherein inserting the material into the mold cavity comprises inserting the plurality of segments to define a plurality of layers in the mold cavity.

4. The method of claim 1, wherein the apparatus includes a top surface and a bottom surface defining at least a portion of the mold cavity, and wherein inserting the carbon fiber material into the mold cavity comprises:
placing the material onto the bottom surface of the mold cavity; and
placing the top surface of the mold cavity over the material on the bottom surface of the mold cavity to define a bounded volume for pitch densifying the carbon fiber material.

5. The method of claim 4, wherein compressing the carbon fiber material in the mold cavity comprises actuating the top surface of the mold cavity to compress the carbon fiber material in the mold cavity.

6. The method of claim 5, wherein actuating the top surface of the mold cavity comprises extending a hydraulic piston connected to the top surface of the mold cavity.

7. The method of claim 1, wherein compressing the carbon fiber material comprises compressing the carbon fiber material to between approximately 17 volume percent material and approximately 30 volume percent material.

8. The method of claim 1, further comprising, subsequent to compressing the carbon fiber material in the mold cavity, needling the carbon fiber material to axially entangle the carbon fiber material in the mold cavity.

9. The method of claim 1, wherein introducing the pitch into the mold cavity to densify the compressed carbon fiber material with pitch in the mold cavity using the vacuum pressure infiltration cycle comprises:
creating a vacuum pressure in the mold cavity between approximately 1 torr and approximately 100 torr;
filling the mold cavity with the pitch; and
applying a gas pressure in the mold cavity between approximately 10 pounds per square inch (psi) and approximately 1000 pounds per square inch to force the pitch into the carbon fiber material.

10. The method of claim 1, wherein, subsequent to introducing the pitch to densify the compressed carbon fiber material, the densified compressed carbon fiber material exhibits a density between approximately 1.35 grams per cubic centimeter and approximately 1.5 grams per cubic centimeter.

11. The method of claim 1, wherein compressing the carbon fiber material comprises compressing the carbon fiber material to a density between approximately 0.25 grams per cubic centimeter and approximately 1 gram per cubic centimeter.

12. The method of claim 1, wherein the apparatus comprises:
a gas source configured to supply a gas to the mold cavity to apply a gas pressure in the mold cavity, wherein the gas pressure is sufficient to force pitch into the carbon fiber material in the mold cavity to densify the carbon fiber material; and
a vacuum source configured to create a vacuum pressure in the mold cavity at least prior to the application of the gas pressure.

13. The method of claim 12, wherein introducing the pitch into the mold cavity to densify the compressed carbon fiber material with the pitch in the mold cavity using the vacuum pressure infiltration cycle comprises:
creating a vacuum pressure in the mold cavity via the vacuum source while the compressed carbon fiber material is in the mold cavity;
filling the mold cavity with the pitch; and
applying a gas pressure in the mold cavity via the gas source to force the pitch into the carbon fiber material to densify the compressed carbon fiber material with pitch.

14. The method of claim 1, wherein compressing the carbon fiber material in the mold cavity to increase the fiber volume fraction of the carbon fiber material in the mold cavity comprises compressing the carbon fiber material in the mold cavity to increase the fiber volume fraction of the carbon fiber material in the mold cavity to a predetermined fiber volume fraction.

15. A method comprising:
inserting a carbon fiber material in a mold cavity of an apparatus, wherein the apparatus is configured to densify the carbon fiber material with pitch within the mold cavity using a vacuum pressure infiltration cycle;
prior to densifying the carbon fiber material with the pitch in the mold cavity, compressing the carbon fiber material in the mold cavity to increase the fiber volume fraction of the carbon fiber material in the mold cavity to a predetermined fiber volume fraction by adjusting the mold cavity from a first volume to a second volume less than the first volume; and
following the compression of the carbon fiber material in the mold cavity, pitch densifying the compressed carbon fiber material in the mold cavity using the vacuum pressure infiltration cycle.

\* \* \* \* \*